United States Patent [19]
Bovenkerk

[11] 3,850,053
[45] Nov. 26, 1974

[54] CUTTING TOOL AND METHOD OF MAKING SAME

[75] Inventor: Harold Paul Bovenkerk, Worthington, Ohio

[73] Assignee: General Electric Company, Columbus, Ohio

[22] Filed: Nov. 16, 1972

[21] Appl. No.: 307,187

[52] U.S. Cl.................. 76/101 R, 29/95 A, 51/307, 51/309
[51] Int. Cl............................................ B21k 5/12
[58] Field of Search......... 76/101 A, 101 R; 51/309, 51/307; 29/95 A, 95 D

[56] References Cited
UNITED STATES PATENTS

| | | | |
|---|---|---|---|
| 3,101,260 | 8/1963 | Cheney | 76/101 A |
| 3,407,445 | 10/1968 | Strong | 76/101 A |
| 3,745,623 | 7/1973 | Wentorf et al. | 76/101 A |

Primary Examiner—Leonidas Vlachos

[57] ABSTRACT

A cutting tool of the type used in machining operations has a supporting substrate of metal-cemented carbide which was formed prior to being placed in a pressure chamber. The cutting edge of the tool is composed of diamond integral with the substrate which was grown on the substrate from nondiamond carbon by subjecting the preformed substrate with the carbon in contact therewith to pressures of about 45 kilobars in the pressure chamber at temperatures of 1,400°–1,600°C. The carbide-cementing metal is chosen from among cobalt, nickel and iron — all of which are catalyst metals for the formation of diamond. Under diamond-stable thermodynamic pressure and temperature conditions, the nondiamond carbon is catalyzed by the cementing material to form diamond in predominantly a (111) crystallographic orientation plane to produce columnar grains perpendicular to the diamond-carbide interface.

6 Claims, No Drawings

CUTTING TOOL AND METHOD OF MAKING SAME

BACKGROUND OF THE INVENTION

This invention is aimed at providing a diamond cutting tool for use in machining operations. It is well known that diamond can be grown on the surface of certain catalyst metals under conditions of very high pressure and high temperature. Hall et al. U.S. Pat. No. 2,947,610 discloses and claims methods for growing diamonds on such catalyst metals as iron, cobalt, nickel, and others. Cheney U.S. Pat. No. 3,101,260 discloses and claims the preparation of a diamond cutting tool by converting graphite positioned on a plug of catalyst material to diamond under high-pressure and high-temperature conditions.

Wentorf et al. U.S. Pat. application Ser. No. 212,408, filed Dec. 27, 1971, and assigned to the same assignee as the present application, discloses a diamond formed by sintering a plurality of diamonds with carbide material under high-pressure and high-temperature conditions.

Recent years have witnessed the development of improved carbide cutting tools and tool holders. Such tools and tool holders are exemplified in Kelm U.S. Pat. No. 3,341,920, which is incorporated herein by reference. The cutting tools, which are also referred to as "cutting inserts" or just "inserts", are composed of very hard materials such as tungsten carbide, titanium carbide, and tantalum carbide. They are usually made by sintering carbide powders of very small particle size mixed with powders of iron, cobalt, or nickel. The iron, cobalt, or nickel serves as a cement to hold the carbide particles together. While cemented carbide cutting tools can be provided in a variety of shapes to meet particular service requirements, the configurations disclosed in the Kelm patent are in greatest demand. These consist of "wafers" of triangular, square, or circular configuration. Each wafer has a central apperture for the insertion of a pin which locks the wafer on a toolholder which is, in turn, mountable on a machine tool such as a lathe. The cutting tools or inserts of the type disclosed in the Kelm patent are typical of the applications of the present invention. While Kelm discloses the use of a locking pin for positioning the inserts other means such as clamps are frequently used.

SUMMARY OF THE INVENTION

This invention is directed to a cutting tool in which a cemented carbide serves as a supporting base or substrate for an integral diamond compact which serves as the cutting edge of the tool. The cutting tool is produced by subjecting a formed carbide base or substrate with which non-diamond carbonaceous material such as graphite is in contact to temperatures and pressures at a level where diamond is the thermodynamically stable form of carbon. The cementing metal for the carbide is cobalt, iron, or nickel, or mixtures thereof. These metals serve to catalyze the transformation of the nondiamond carbonaceous material to diamond under the high-pressure and high-temperature conditions to which the carbide and contacting nondiamond carbonaceous material are subjected. This results in the growth of diamond particles having a preferred crystallographic orientation.

DESCRIPTION OF THE PREFERRED EMBODIMENT

The metal-cemented carbides used in the present invention are preferably those which have a relatively high content of cementing metal. It is well known that the hardest carbides are those with a low cementing metal content. A typical hard carbide cutting tool will have about 3 to 8% by weight of cementing metal. However, the harder the carbide the more relatively brittle it is. In the present invention some of the cementing metal or binder is bled out of the cemented carbide piece. In order to leave the final cemented carbide substrate with sufficient binder to supply catalyst metal and yet not be so depleted of binder that it loses strength, it is preferred to use carbides of greater than 6 percent binder and more preferably in the range 10 to 20 percent. While they are somewhat less hard than carbides having a lower content of cementing metal, the loss of hardness is more than offset by the reduced brittleness. A typical carbide having properties useful in the practice of the present invention is tungsten carbide cemented with 13 percent by weight of cobalt. Such a level of cementing metal will readily supply catalyst to promote diamond formation under conditions of high-temperature and high-pressure.

The carbide base or substrate may be formed by pressing very fine powders into shape and then sintering in accordance with conventional techniques. As pointed out in the discussion of the Kelm patent the supporting base may be specially designed to accommodate to a particular end use or it may take the shape of a circular, triangular, or square wafer.

The carbide base is placed in the reaction chamber of a high-temperature high-pressure apparatus which may be of the type disclosed and claimed in Hall U.S. Pat. No. 2,941,248 which is incorporated herein by reference. A nondiamond carbonaceous material, which may conveniently be graphite, is placed in contact with the portion of the carbide base where it is desired that a cutting edge be formed. Portions of the carbides where no diamond growth is desired can be in contact with a noncarbon substrate such as ceramics, salts, etc. The growth of the diamond can be limited in thickness by limiting the source of nondiamond carbon. The reaction enclosure or chamber is then subjected to temperature and pressure conditions which are at the level where diamond is the thermodynamically stable form of carbon. Typically, the pressure is in excess of 45 kilobars and the temperature in the range of 1,400°–1,600°C. Under these condition the nondiamond carbonaceous material is converted to diamond — a sufficient quantity of cementing metal being drawn from the carbide to serve as catalyst — and the diamond so grown is much more firmly attached to the carbide substrate than is normally the case with a noncarbide substrate. It is desirable that the diamond particles be in the form of a thin layer and that the particles be of a uniform very fine particle size. For this reason the apparatus is maintained at diamond-forming pressures and temperatures for a very short time. A time period of the order of 30 seconds is sufficient. Where a time interval of the order of 20 minutes was used the diamond particles were relatively coarse and the diamond layer was thicker than necessary. While the produce made by a 20-minute cycle was satisfactory for some applications, generally a shorter time interval produced a preferred product.

At the conclusion of the press cycle the temperatures of the charge is first lowered by cutting off the heating circuit and the pressure is then reduced. The contents of the chamber are removed therefrom and the carbide base with its adherent diamond compact is separated from the matrix by mechanical means.

An unexpected benefit accruing to the use of this invention is that the diamonds are composed of columnar grains perpendicular to the diamond-carbide interface. This confers on the diamonds a preferred crystallographic orientation. The resulting surface is predominantly the (111) (Miller indices) plane of diamond, which is the most abrasion resistant. While this orientation makes the tool doubly difficult to surface-shape, the end product has a diamond cutting edge with enhanced machining ability. Such a tool proved capable of machining an exceedingly hard carbide containing 6 percent cobalt as the cementing metal. Other tools having cutting edges of nonoriented diamond compact were unable to machine similar carbide workpieces.

While the invention has been described with reference to specific embodiments, it is obvious that there may be variations which properly fall within the scope of the invention. Accordingly, the invention should be limited in scope only as may be necessitated by the scope of the appended claims.

What I claim as new and desire to secure by letters patent of the United States is:

1. The method of making a diamond-tipped tool which comprises the steps of:

positioning in an enclosure a formed mass of metal-cemented carbide and a mass of nondiamond carbonaceous material in contact therewith, the carbide being selected from the group consisting of tungsten carbide, titanium carbide, tantalum carbide, and mixtures thereof, and the cementing metal being selected from the group consisting of cobalt, nickel, and iron, and mixtures thereof;

applying pressures in excess of 45 kilobars to the contents of said enclosure while heating said contents to temperatures in the range of 1,400°–1,600°C;

reducing the temperature of said contents;

reducing the pressure on said contents; and removing said contents from said enclosure.

2. The method of claim 1 wherein the carbide is tungsten carbide and the cementing metal is cobalt.

3. The method of claim 2 wherein the cobalt is 10–20 percent by weight of the carbide.

4. The method of claim 1 wherein the carbonaceous material is graphite.

5. A cutting tool for machining with diamond comprising:

a shaped supporting substrate composed of a carbide selected from the group consisting of tungsten carbide, titanium carbide, tantalum carbide, and mixtures thereof, cemented with a metal selected from the group consisting of cobalt, nickel and iron, and mixtures thereof; and at least one cutting edge of diamond compact integral with said substrate, said diamond compact being composed of columnar grain perpendicular to the diamond-carbide interface having predominantly a (111) crystallographic orientation.

6. A tool as claimed in claim 5 wherein the carbide is tungsten carbide and the cementing metal is cobalt.

* * * * *